(12) United States Patent
Godoy et al.

(10) Patent No.: US 8,121,275 B2
(45) Date of Patent: Feb. 21, 2012

(54) TEMPORARY PROVISIONED PUBLIC CALL TREATMENT FOR CALLS INITIATED FROM A PRIVATE PARTY DEVICE

(75) Inventors: Mario Francisco Godoy, Elmhurst, IL (US); David A Jones, Orland Hills, IL (US)

(73) Assignee: Alcatel Lucent, Paris (FR)

( * ) Notice: Subject to any disclaimer, the term of this patent is extended or adjusted under 35 U.S.C. 154(b) by 967 days.

(21) Appl. No.: 12/150,499

(22) Filed: Apr. 29, 2008

(65) Prior Publication Data
US 2009/0268893 A1 Oct. 29, 2009

(51) Int. Cl.
*H04M 3/42* (2006.01)
(52) U.S. Cl. ............... 379/201.12; 379/207.03
(58) Field of Classification Search ............. 379/114.05, 379/114.2
See application file for complete search history.

(56) References Cited

U.S. PATENT DOCUMENTS
5,384,831 A * 1/1995 Creswell et al. ......... 379/114.05
* cited by examiner

*Primary Examiner* — Creighton Smith
(74) *Attorney, Agent, or Firm* — S. R. Santema

(57) ABSTRACT

Methods are disclosed for provisioning a private party telephony device for public call treatment on a temporary basis (for example, before allowing third party use of the device) and applying such public call treatment for call originations or terminations. Billing in public call treatment is arranged with assistance of an operator services platform with the user (for example, the third party user) of the private party telephony device. Advantageously, therefore, in public call treatment mode, the owner of the private party phone need not police third party use of the phone and will not be billed for such third party use. The owner may resume private call treatment when desired by converting the device from public mode to private mode.

20 Claims, 7 Drawing Sheets

TEMPORARY PROVISIONED PUBLIC CALL TREATMENT FOR CALLS INITIATED FROM A PRIVATE PARTY DEVICE

FIELD OF THE INVENTION

This invention relates generally to the field of communication systems and, more particularly, to methods for providing temporary public call treatment for calls initiated from or received by a private party telephony device.

BACKGROUND OF THE INVENTION

So-called "pay phones" or public-access phones are a well known modality through which persons may initiate (and in some instances, receive) telephone calls. Typically, the public-access phones are connected to an operator services platform (a.k.a., operator services switch) to receive and process the call. The operator services platform performs functions including, without limitation, processing collect and coin toll calls, charge to credit card, calling card or third number; providing information content and providing associated announcements and routing of the call. The functions and call treatment provided by the operator services platform (herein referred to as "public call treatment") may be automated or provided with assistance of one or more human operators.

Private party phones, for example, mobile or landline phones, belonging to particular individuals, households or enterprises are of course another well known modality through which persons may initiate or receive telephone calls and request and receive information content. Call treatment for private party phone service (herein referred to as "private call treatment") is usually accomplished by a call control element such as a central office switch (for wireline calls) or a serving mobile switching center (for wireless calls) without assistance of an operator services platform. Billing for the private party call is typically conducted on a periodic basis (e.g., monthly) and may include fees for local and/or long distance calls initiated from the private party phone during the billing period. Alternatively, a prepaid billing model may be used wherein the customer pays in advance to establish a prepaid balance and fees for local and/or long distance calls are deducted from the prepaid balance.

It is possible for a private party phone to connect to an operator services platform on a call-by-call basis, for example, by appending a "0" prefix to the dialed digits of an outgoing call to initiate collect, credit card, calling card or third number billing or the like (effectively, public call treatment). However, in absence of affirmative connection to an operator services platform by "0" prefix or the like, the private party phone is provisioned for private call treatment and charges for the call will be billed by default to the individual, household or enterprise registered as the owner of the private party phone.

Unfortunately, this arrangement is subject to abuse in instances where the owner of the private party phone allows use of the phone by third parties. Unless the owner is able to police the third party use (for example, to restrict the third party to local calls or to ensure the party connects to an operator services platform to initiate alternate billing), it is possible that the third party may make long distance calls or the like that will be billed to the owner.

SUMMARY OF THE INVENTION

This problem is solved and a technical advance is achieved in the art by a feature whereby a party may temporarily provision public call treatment for calls initiated from their private party device (i.e., convert their private telephony device to a public telephony device), for example, before allowing third party use of their device. In public call treatment mode, call originations are routed to an operator services platform to arrange billing in similar fashion to a traditional public-access phone. Advantageously, therefore, in public call treatment mode, the owner of the private party phone need not police third party use of the phone and will not be billed for such third party use. The owner may resume private call treatment when desired by converting the device from public mode to private mode.

In one embodiment, a method for provisioning public call treatment for a private party telephony device comprises receiving, by a call control element from a private party telephony device, a request to activate public call treatment for one or more subsequent call originations from the private party telephony device or call terminations directed to the private party telephony device. Responsive to the request, the call control element updates a subscriber profile associated with the private party telephony device to indicate public call treatment, thereby temporarily provisioning the private party telephony device for public call treatment. Thereafter, for so long as the private party telephony device is provisioned for public call treatment, the call control element provides public call treatment for calls initiated from the private party telephony device or call terminations directed to the private party telephony device.

Some time later, the owner of the private party device may send the call control element a request to deactivate public call treatment. Responsive to the request, the call control element updates the subscriber profile associated with the private party telephony device to indicate private call treatment, thereby returning the private party telephony device to private call treatment. For so long as the private party telephony device is provisioned for private call treatment, the call control element provides private call treatment for calls initiated from the private party telephony device or call terminations directed to the private party telephony device.

In another embodiment, there is provided a method, performed by a call control element, for processing a call initiation from a private party telephony device. The method comprises receiving a call initiation from a private party telephone device; determining a call treatment status of the private party telephony device, the call treatment status being provisionable between a private call treatment status and public call treatment status; and if the private party device is provisioned for public call treatment status, providing public call treatment for the call; otherwise if the private party device is provisioned for private call treatment status, providing private call treatment for the call.

In another embodiment, there is provided a method, performed by a call control element, for processing a call termination directed to a private party telephony device. The method comprises receiving a call request directed to a private party telephone device; determining a call treatment status of the private party telephony device, the call treatment status being provisionable between a private call treatment status and public call treatment status; and if the private party device is provisioned for public call treatment status, providing public call treatment for the call; otherwise if the private party device is provisioned for private call treatment status, providing private call treatment for the call.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
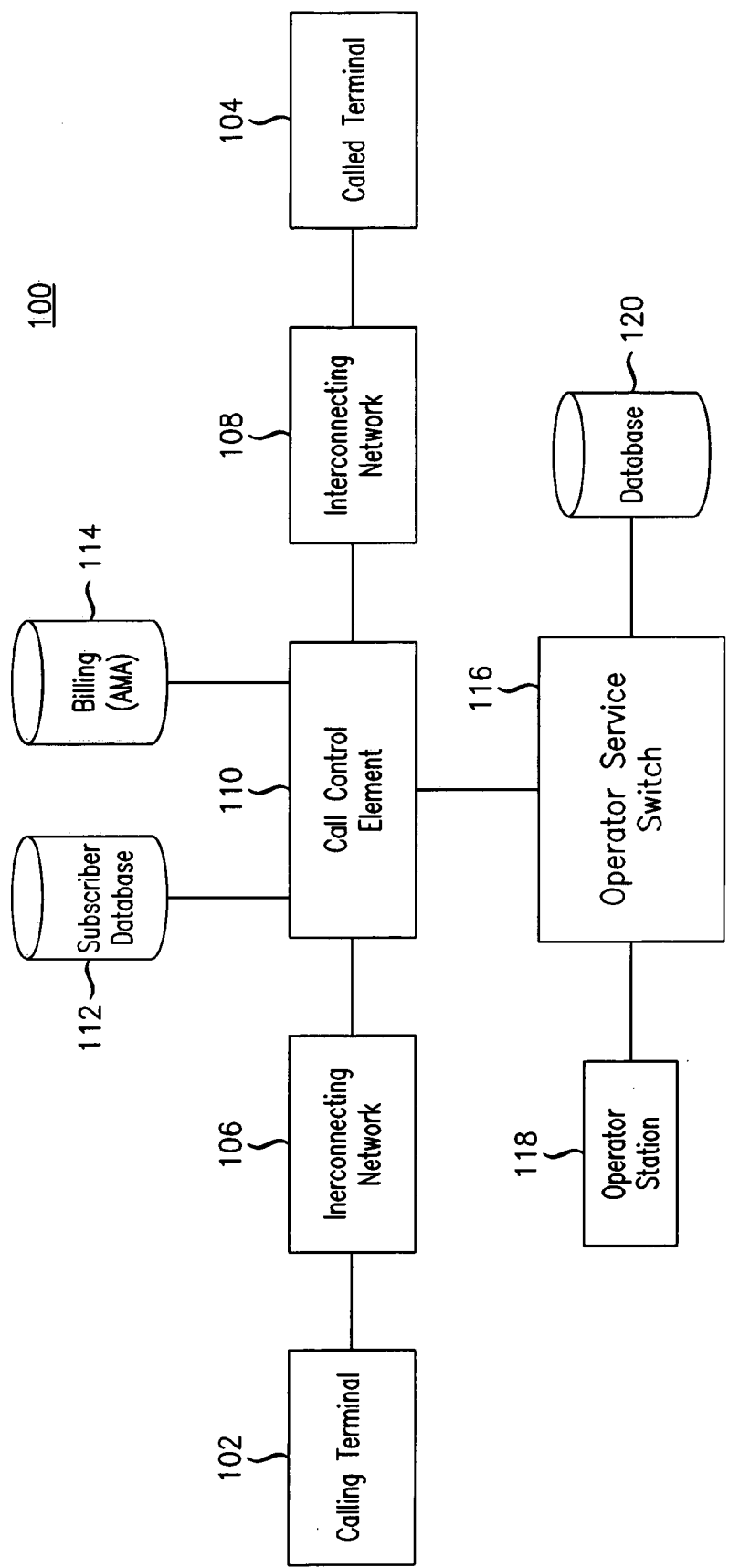
FIG. 1 is a block diagram of a communication system in which embodiments of the present invention may be implemented.

FIG. 1 depicts a communications system 100 in an exemplary embodiment of the invention. Communication network 100 may comprise, for example, a wireline or a wireless telephony network or an IP-based network such as an IP Multimedia Subsystem (IMS) network. Communication network 100 serves a plurality of telephony devices 102, 104 (two shown). The telephony devices 102, 104 may comprise generally any device having the capacity to initiate or receive calls or request and receive information content via the communication system 100. The telephony devices 102, 104, may comprise, for example and without limitation, mobile phones, wireline phones, a PDAs, VoIP phones or SIP phones, laptops or desktop computers. The telephony devices 102, 104 may employ user interfaces including, without limitation, numeric or alpha-numeric keypads, keyboards, text displays, audio-visual displays and the like to initiate and receive calls or request and receive information content through communication system 100. For purposes of illustration, it is presumed one of the devices has initiated a call to the other device. The device having initiated the call request is denoted the calling terminal 102 and the device to which the call is directed is denoted the called terminal 104.

The calling and called terminals 102, 104 communicate via respective interconnecting networks 106, 108 with a call control element 110 for processing and switching calls, for providing various call features to the calling and called terminals and for providing access to other elements of the communication system 100. The call control element 110 may comprise, for example, a central office switch, a serving mobile switching center (MSC) or a serving-Call Session Control Function (S-CSCF) in the case of a wireline, wireless or IMS network, respectively. As will be appreciated, the call control element 110 is a functional element that may reside within a single device or may be distributed among multiple devices.

The call control element 110 is linked to a subscriber database 112 and a billing system 114. The subscriber database 112 comprises any database or database system that stores subscriber information or subscriber profiles applicable to subscribers of the communication network. The billing system 114 comprises any system or server adapted to implement subscriber billing associated with subscribers of the communication network. In one embodiment, the billing system includes a database (not shown) that stores information associated with customers' private party service plans and billing rates, etc. and usage data; and, based on the applicable rates/plans and usage data of each customer, the billing center computes accumulated charges and sends customers billing statements on a periodic basis (e.g., monthly) for accrued private party services. Alternatively, the billing system may implement a prepaid billing model for private party services.

An operator services platform comprising an operator services switch 116, operator position 118 and a database 120 is operably connected to the call control element 110. The operator services platform is utilized to implement public call treatment, for example and without limitation, collect, credit card, calling card or third number billing for calls initiated from a public access phone. As noted, the operator switch is also operable to provide collect, credit card, calling card or third number billing (effectively, public call treatment) for certain calls initiated from a private party phone, determined on a call-by-call basis responsive to the caller appending a "0" prefix to the dialed digits of an outgoing call.

In absence of affirmative connection to an operator services platform by "0" prefix or the like, the private party phone is typically provisioned for private call treatment. In case of private call treatment, the call control element 110 and billing system 114 will process the call independently of the operator services switch 116 and charges for the call will be billed to the individual, household or enterprise registered as the owner of the private party phone.

According to embodiments of the present invention, the owner may provision public call treatment for calls initiated from their private party device for a period of time ("temporary provisioned public call treatment"); and the owner may resume private call treatment when desired by converting the device from public mode to private mode. In one embodiment, for so long as the private party device is in public call treatment mode, any call originations from the device are routed to the operator services switch 116 to implement collect, credit card, calling card or third number billing for the call. When the private party device is returned to private mode, default call treatment resumes and call originations are handled by the call control element independent of the operator services switch (with the exception of calls affirmatively connected to an operator services platform by "0" prefix or the like, which are routed to the operator services switch).

Figure 2:
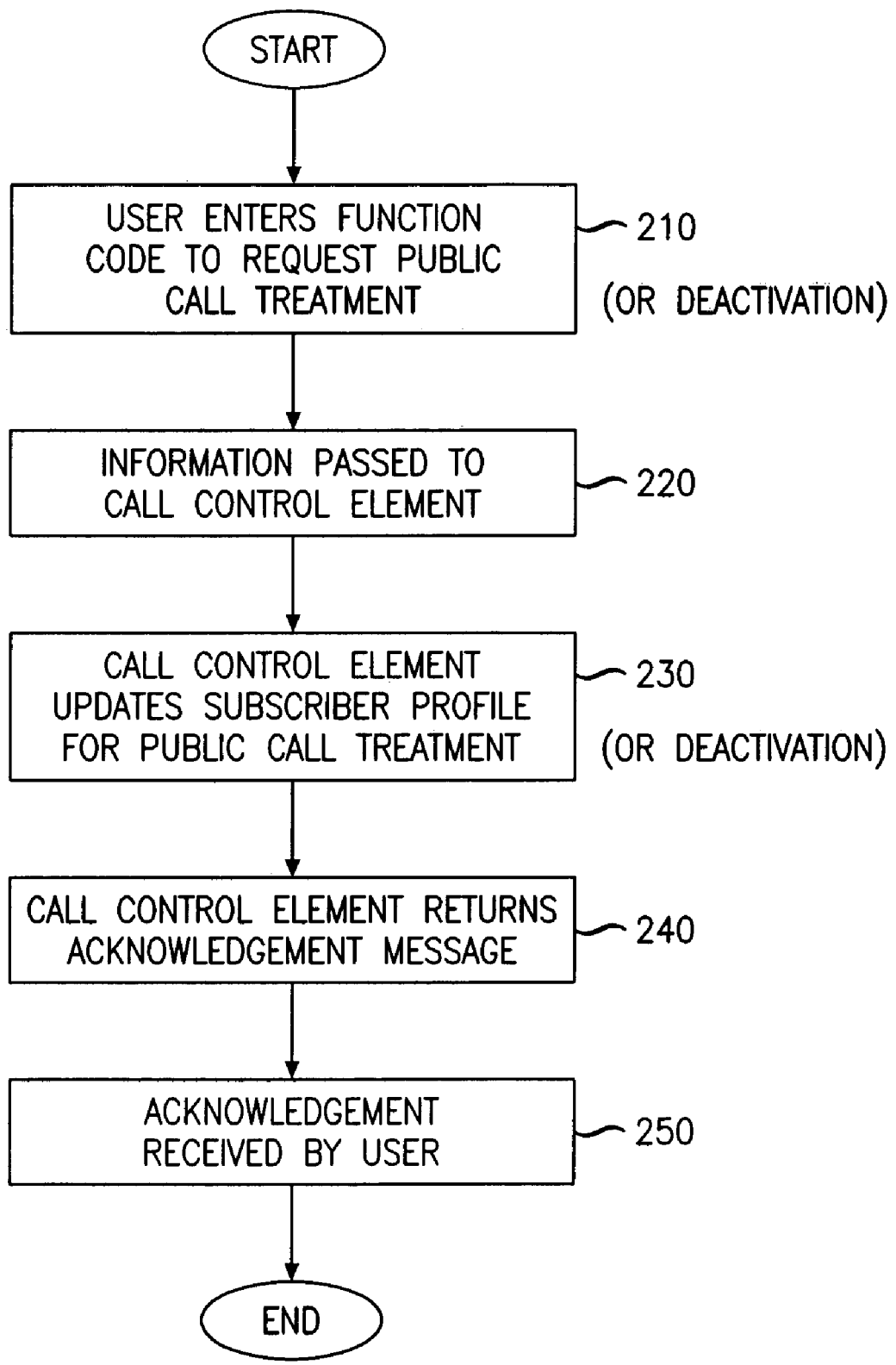
FIG. 2 is a flowchart of a method for activating (or deactivating) public call treatment from a private party device according to an embodiment of the invention.

Turning now to FIG. 2, there is shown a flowchart of a method that may be implemented in the communication system of the type shown in FIG. 1, for an owner or authorized user of a private party telephony device to activate or deactivate temporary provisioned public call treatment. In one embodiment, the term "authorized user" defines a person who is authorized by the owner to use the private party telephony device in private call treatment mode. Optionally, the term "authorized user" may include persons (e.g., third party users) who are authorized to use the telephony device in public mode. For convenience, the term "user" shall be used hereinafter to refer to the owner or authorized user operating the private party telephony device, either in private mode or public mode.

With reference to FIG. 1, the steps of FIG. 2 are implemented in the context of communication between calling terminal 102 and the call control element 110. The term "calling terminal" shall be understood to comprise a private party telephony device, for example and without limitation, a mobile phone, wireline phone, a PDA, VoIP phone or SIP phone, laptop or desktop computer operated by the user to activate or deactivate temporal provisioned public call treatment. As will be appreciated, communication between calling terminal 102 and call control element 110 in the context of activating or deactivating temporary provisioned public call treatment may be implemented independently from (or alternatively, coincident to) a call initiation or termination or request for information content.

Presuming initially that the calling terminal 102 is provisioned for private call treatment, the user initiates a request for public call treatment at step 210 by entering a predesignated function code and password (e.g., *XX+password) on the calling terminal 102. Similarly, in such case that the calling terminal has previously been provisioned for public call treatment, the user initiates a request to deactivate public call treatment at step 210 by entering a predesignated function code and password on the calling terminal. Depending on implementation, the function code for activation and deactivation of public call treatment may be the same or different. At step 220, the request information is passed from the calling terminal 102 to the call control element 110 via the interconnecting network 106.

At step 230, having received the request information, the call control element 110 flags the calling terminal 102 for public call treatment (in the case of a request for public call treatment) or private call treatment (in the case of a request to deactivate public call treatment) and causes the subscriber database 112 to be updated accordingly. In one embodiment, if a terminal 102 (or 104) is flagged for public call treatment, public call treatment applies to the terminal for call originations, terminations and requests for information content that occur while the terminal is flagged for public call treatment. Alternatively, public call treatment may be configured at time of activation to include only a subset of call originations, terminations, and requests for information content. For example, public call treatment may be configured at the request of the owner or authorized user, or independently by the call control element, to authorize call originations but exclude (i.e., "turn off") call terminations.

In one embodiment, call originations from a terminal 102 flagged for public call treatment will be routed to the operator services switch 116 to implement collect, credit card, calling card or third number billing for the call. Conversely, when the subscriber profile is flagged for private call treatment, call originations are handled by the call control element 110 independent of the operator services switch. As will be appreciated, the term "flagged" as used herein is a functional term referring to a manner of identifying the present call treatment status of the calling terminal 102 in the subscriber database 112. It does not mean to suggest an implementation limited to a particular icon or symbol; rather, the call treatment status may be identified in the database 112 by generally any means presently known or devised in the future.

Optionally, at step 230, the call control element may assign a temporary directory number (i.e., a directory number that differs from the number provisioned for private call treatment) responsive to flagging a calling terminal for public call treatment. In one embodiment, if a temporary directory number is so assigned, the temporary number applies to the terminal for call originations, terminations and requests for information content (or if applicable, a subset of call originations, terminations and requests for information content) that occur while the terminal is flagged for public call treatment. Further, if a temporary number is assigned for public call treatment, the call control element may reassign the number provisioned for private call treatment responsive to deactivating public call treatment.

At step 240, the call control element generates an acknowledgment message and it is returned to the calling terminal 102 via the interconnecting network 106. At step 250, the calling terminal 102 receives the acknowledgement message and hence the user is made aware of that the request has been implemented to effect public call treatment (in the case of a request for public call treatment) or return to private call treatment (in the case of a request to deactivate public call treatment).

Figure 3:
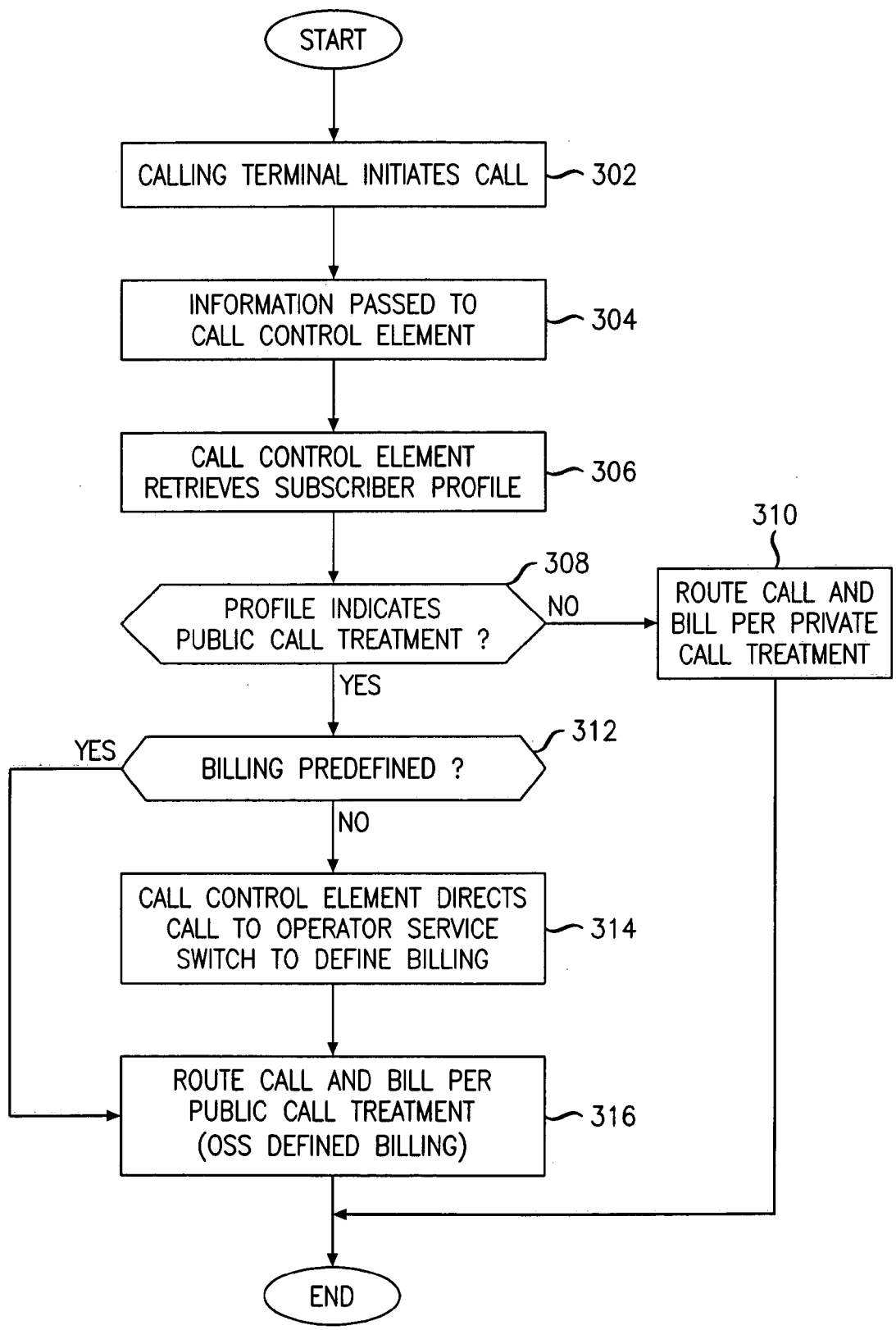
FIG. 3 is a flowchart of a method for processing a call origination from a private party device subject to public call treatment according to an embodiment of the invention.

Turning now to FIG. 3, there is shown a flowchart of a method that may be implemented in the communication system of the type shown in FIG. 1 for processing a call origination from a private party device subject to public call treatment according to an embodiment of the invention. With reference to FIG. 1, the steps of FIG. 3 are implemented in the context of a call originated by calling terminal 102 and directed to called terminal 104.

At step 302 the calling terminal 102 initiates a call, for example and without limitation, by entering or dialing a directory number (DN) associated with the called terminal 104. At step 304, the directory number information, along with relevant control, signaling and authentication information is passed from the calling terminal 102 to the call control element 110 via interconnecting network 106.

At step 306, the call control element 110 retrieves the subscriber profile from database 112; and at step 308, the call control element determines whether or not the subscriber profile indicates that calling terminal 102 is flagged for public call treatment.

If the profile does not indicate public call treatment, the method proceeds to execute private call treatment at step 310. Typically, under private call treatment, the call control element 110 analyzes the received digits to determine routing for the call; and then routes the call through interconnecting network 108 toward the called terminal 104 without connection to or assistance from operator service switch 116. In one embodiment, the call control element further arranges billing for the call according to the billing model associated with the calling terminal 102. If a prepaid billing model is used, the call control element is operable to end the call if the prepaid balance is consumed; and optionally, may provide an announcement to the calling terminal 102 prior to expiration of the balance.

If the profile indicates public call treatment, the method proceeds to steps 312, 314 and 316 to execute public call treatment. According to embodiments of the present invention, under public call treatment, the call control element routes the call to the operator services switch 116 to implement collect, credit card, calling card or third number billing for the call (or alternatively, to confirm that billing has been predefined). Typically, after billing is arranged with the operator services switch, call control is resumed by the call control element to determine routing for the call and to implement routing through interconnecting network 108 toward the called terminal 104.

In one embodiment, billing for the calling terminal 102 in public mode can be prearranged with the operator services switch 116 prior to a call initiation or active call. Hereinafter, this will be referred to as predefined billing. Predefined billing may be implemented, for example, by the calling terminal entering a predesignated function code and password (advantageously, the code will differ from the code used to request or deactivate public call treatment). The call control element receives the code information and consults the database 112 to identify the profile of the calling terminal. Presuming the calling terminal is in public mode, the call control element connects the calling terminal 102 to the operator services switch 116 to arrange billing. Billing may be arranged, for example and without limitation, by the operator of the calling terminal 102 exchanging credit/debit card information with an operator station 118 associated with the operator services switch; and the operator station 118 subsequently validating the credit/debit card. In one embodiment, if billing is predefined, the operator services switch keeps a record of the billing information in database 120. Alternatively or additionally, the operator services switch may pass information associated with the predefined billing status to the call control element such that at least a portion of the predefined billing information may be stored in the subscriber database 112.

At step 312, the call control element determines whether or not public mode billing has been predefined with the operator services switch. In one embodiment, this is accomplished by the call control element querying the operator services switch coincident to processing an active call. Alternatively, if predefined billing status information is stored in the subscriber database 112, the call control element can determine whether or not billing has been predefined without querying the operator service switch.

If it is determined at step 312 that public mode billing arrangements have not been predefined, the call control element directs the call to the operator services switch at step 314 to define billing arrangements coincident to the instant call. Billing for the instant call may be arranged similarly to predefined billing, for example, through exchange and validation of credit/debit card information with an operator station 118 and recordation of the billing information in database 120 and/or subscriber database 112. After billing is arranged with the operator services switch, call control is resumed by the call control element at step 316 to determine routing for the call and to implement routing through interconnecting network 108 toward the called terminal 104.

If it is determined at step 312 that public mode billing has already been predefined, the method proceeds to step 316 and call control resumes by the call control element without consultation with the operator services switch. Alternatively, the call control element may consult with the operator services switch to confirm that predefined billing has been arranged.

In one embodiment, the call control element executes billing for the call at step 316 according to the billing arrangement defined by the operator services switch and communicated to the call control element, whether billing is predefined or defined coincident to the instant call. Alternatively, the operator services switch may execute billing for the call. In either case, if a prepaid billing model is used, the call control element is operable to end the call if the prepaid balance is consumed; and optionally, may provide an announcement to the user prior to expiration of the balance.

Figure 4:
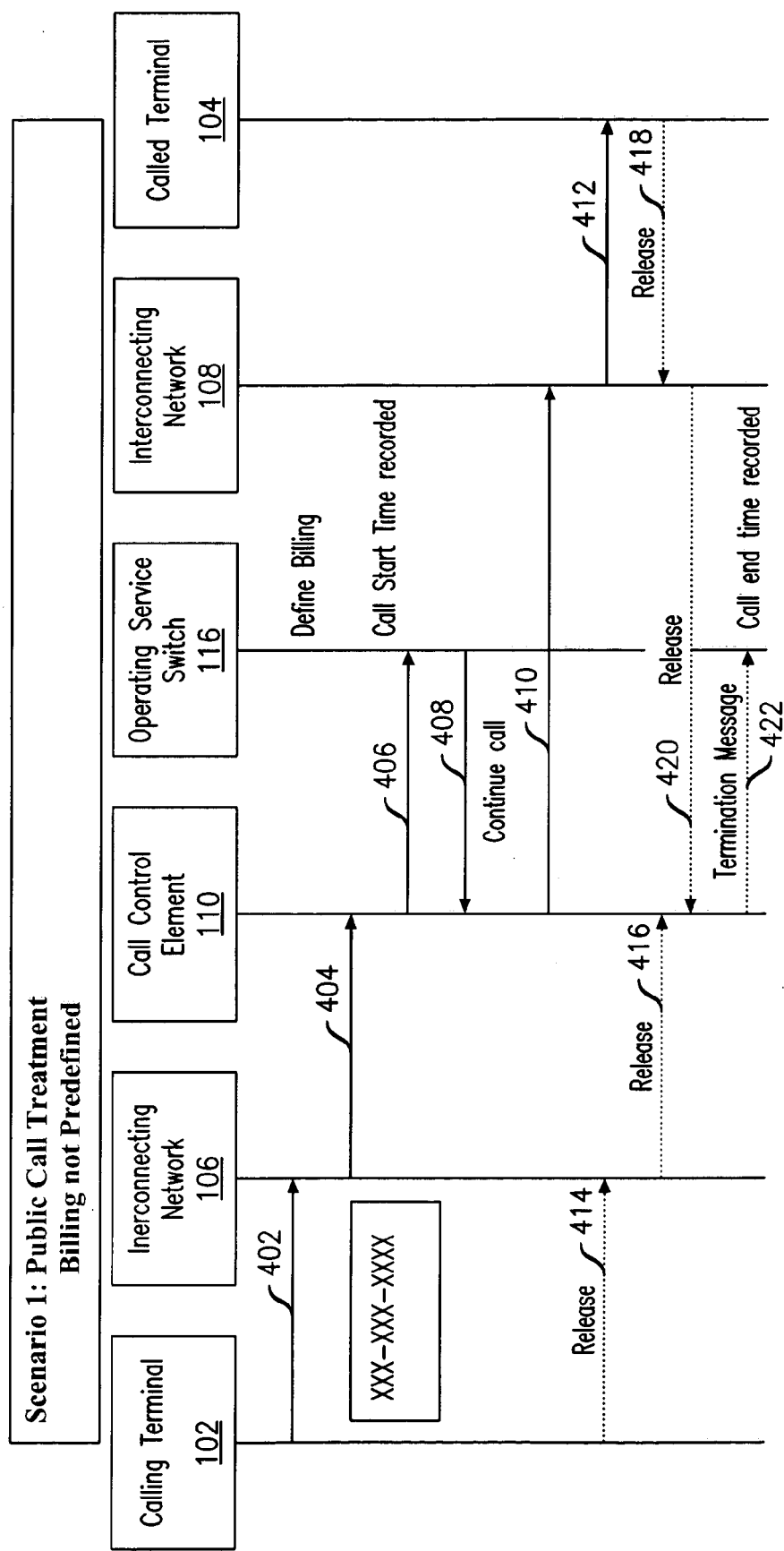
FIG. 4 is a message sequence chart illustrating a public call treatment scenario in which billing is defined coincident to receiving a call from a private party.

FIG. 4 shows a message sequence associated with a public call treatment scenario in which billing is defined coincident to processing an active call (i.e., billing is not predefined). The message sequence begins with the calling terminal 102 initiating a call directed to called terminal 104. (The message sequence presumes that public phone treatment has been activated for calling terminal 102 prior to initiation of the call.) The call initiation yields a message 402 passed from the calling terminal 102 to interconnecting network 106 and message 404 passed from the interconnecting network 106 to the call control element 110. The messages 402, 404 include, without limitation, directory number information or other indicia of the calling terminal 102 and called terminal 104.

Responsive to receiving message 404, the call control element consults the subscriber database 112 to identify the subscriber profile of calling terminal 102 which in the present example, will indicate public call treatment since public phone treatment has been activated prior to initiation of the present call. Having identified a public call treatment profile, the call control element directs the call to the operator services switch 116 via message 406. In one embodiment, the message 406 includes, without limitation, directory number information or other indicia of the calling terminal 102 and called terminal 104 and subscriber profile information associated with the calling terminal.

Responsive to receiving message 406, the operator services switch (optionally, with operator assistance) obtains credit/debit card, calling card or third number billing information associated with the operator of calling terminal 102 and validates the information and/or the credit source to define billing arrangements with the operator of calling terminal 102. In one embodiment, after billing is defined, the operator services switch records relevant billing information in the operator service switch database 120 and records the start of the call, then via message 408 instructs the call control element to continue the call. The call is then routed via message 410 passed from the call control element to interconnecting network 108 and message 412 passed from the interconnecting network 108 to the called terminal 104.

After the call is released by calling terminal 102, message 414 is passed from the calling terminal 102 to interconnecting network 106 and message 416 is passed from the interconnecting network 106 to call control element 110. Similarly, call release from the called terminal yields message 418 passed from the called terminal to interconnecting network 108 and message 420 passed from the interconnecting network 108 to call control element 110. Responsive to receiving the release messages, the call control element 110 issues a termination message 422 causing the operator services switch to record the end time of the call. The operator services switch thereafter bills the call according to the billing arrangements that were defined for the call.

Figure 5:
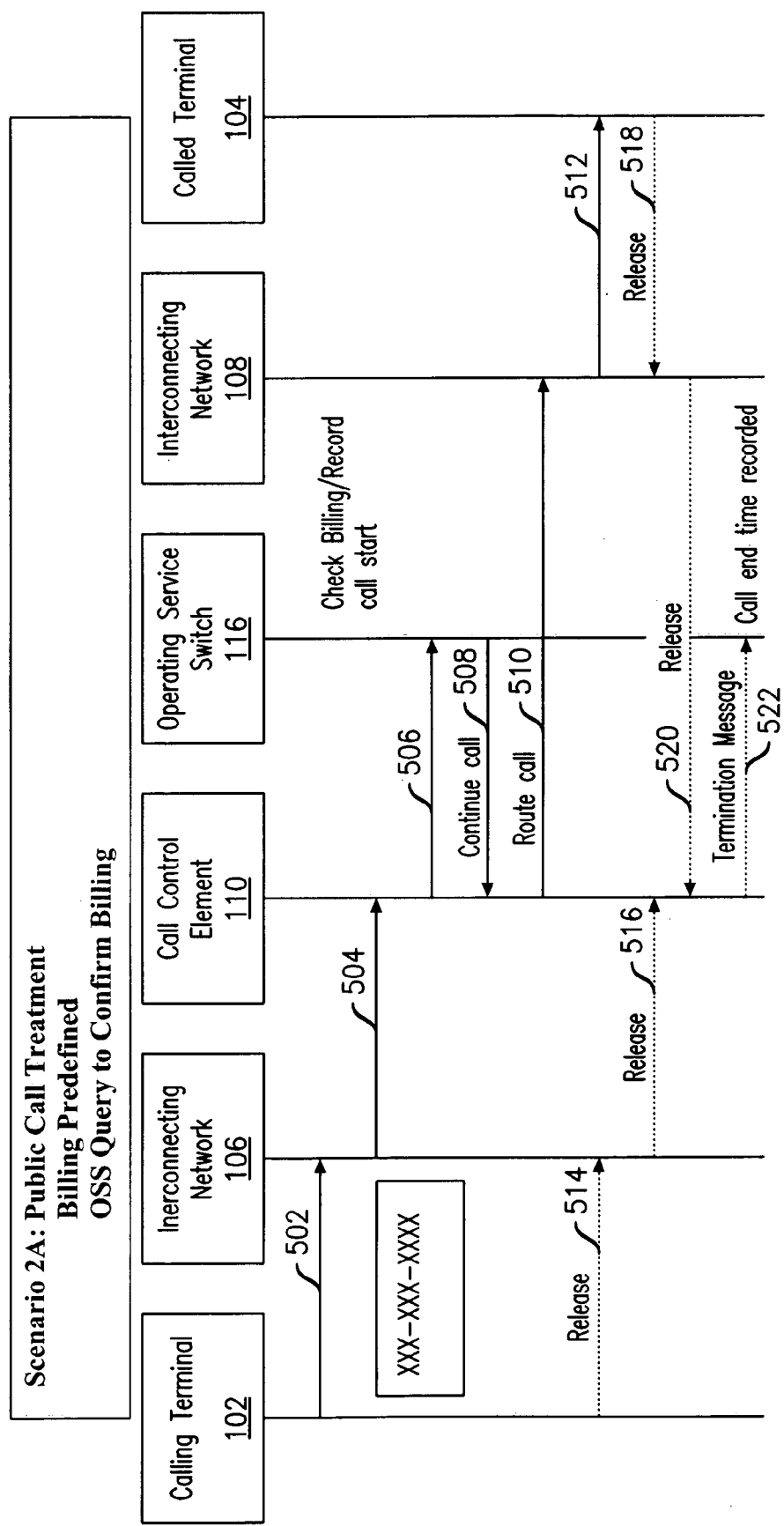
FIG. 5 is a message sequence chart illustrating a first exemplary public call treatment scenario in which billing is predefined prior to receiving a call from a private party.

FIG. 5 shows a message sequence associated with a scenario in which public call treatment has been activated for calling terminal 102 and some time prior to initiation of a call, billing has been predefined. Thereafter, a call initiation from calling terminal 102 yields a message 502 passed from the calling terminal 102 to interconnecting network 106 and message 504 passed from the interconnecting network 106 to the call control element 110. The messages 502, 504 include, without limitation, directory number information or other indicia of the calling terminal 102 and called terminal 104.

Responsive to receiving message 504, the call control element consults the subscriber database 112 to identify the subscriber profile of calling terminal 102 (in the present example, public call treatment). The call control element then directs the call to the operator services switch 116 via message 506. In one embodiment, the message 506 includes, without limitation, directory number information or other indicia of the calling terminal 102 and called terminal 104 and subscriber profile information associated with the calling terminal.

In the present example, billing has been predefined with the operator services switch prior to the call. Responsive to receiving message 406, the operator services switch (optionally, with operator assistance) confirms the predefined billing and records the start of the call, then via message 508 instructs the call control element to continue the call. The call is then routed via message 510 passed from the call control element to interconnecting network 108 and message 512 passed from the interconnecting network 108 to the called terminal 104.

After the call is released by calling terminal 102, message 514 is passed from the calling terminal 102 to interconnecting network 106 and message 516 is passed from the interconnecting network 106 to call control element 110. Similarly, call release from the called terminal yields message 518 passed from the called terminal to interconnecting network 108 and message 520 passed from the interconnecting network 108 to call control element 110. Responsive to receiving the release messages, the call control element 110 issues a termination message 522 causing the operator services switch to record the end time of the call. The operator services switch thereafter bills the call according to the predefined billing arrangements.

Figure 6:
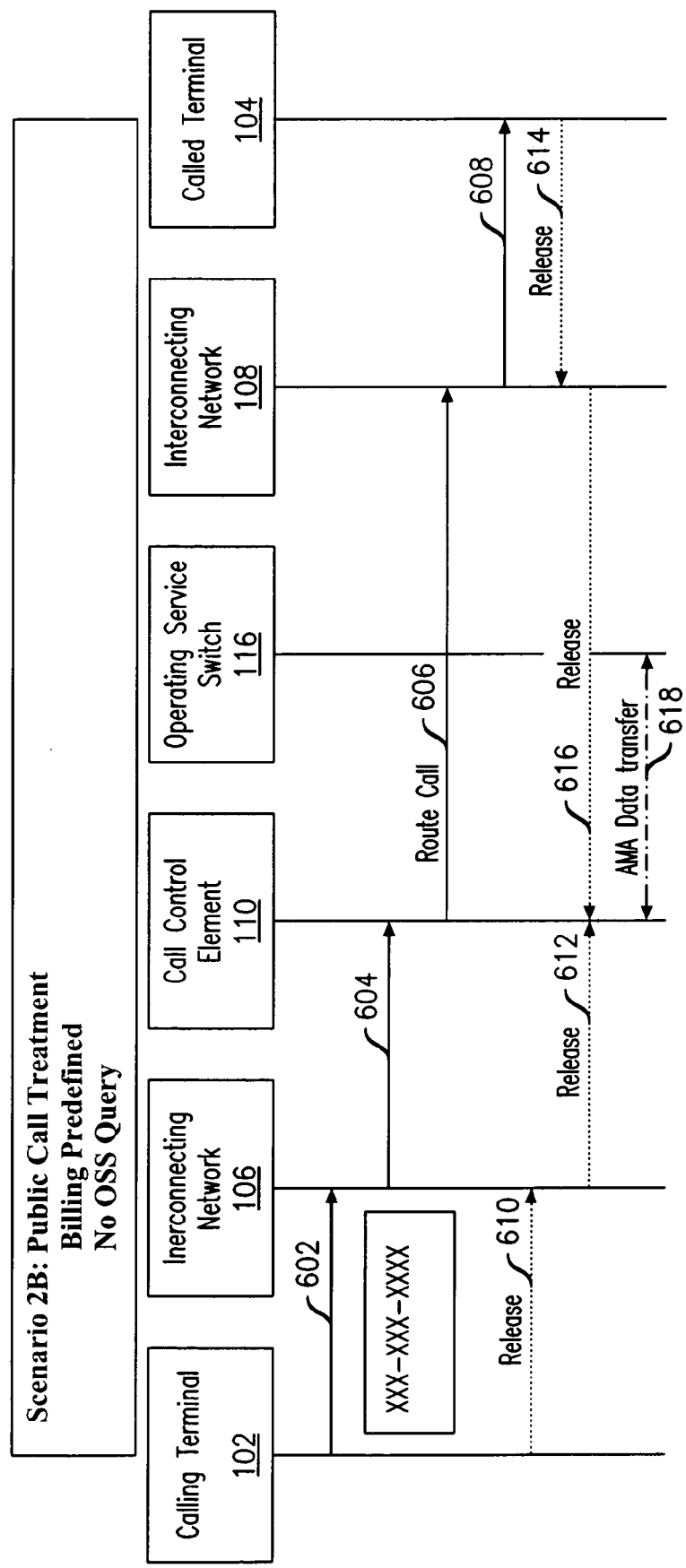
FIG. 6 is a message sequence chart illustrating a second exemplary public call treatment scenario in which billing is predefined prior to receiving a call from a private party.

Now turning to FIG. 6, there is shown another exemplary message sequence associated with a scenario in which public call treatment has been activated for calling terminal 102 and billing has been predefined. A call initiation from calling terminal 102 yields a message 602 passed from the calling terminal 102 to interconnecting network 106 and message 604 passed from the interconnecting network 106 to the call control element 110. The messages 602, 604 include, without limitation, directory number information or other indicia of the calling terminal 102 and called terminal 104.

Responsive to receiving message 604, the call control element consults the subscriber database 112 to identify the subscriber profile of calling terminal 102. In the present example, it is presumed the subscriber profile includes indicia of public call treatment and also indicia of the predefined billing (e.g., "billing is approved") arranged with the operator services switch. Having knowledge that predefined billing is already arranged with the operator services switch, the call control element need not direct the call to the operator services switch and the call is routed via message 606 passed from the call control element to interconnecting network 108 and message 608 passed from the interconnecting network 108 to the called terminal 104.

After the call is released by calling terminal 102, message 610 is passed from the calling terminal 102 to interconnecting network 106 and message 612 is passed from the interconnecting network 106 to call control element 110. Similarly, call release from the called terminal yields message 614 passed from the called terminal to interconnecting network 108 and message 616 passed from the interconnecting network 108 to call control element 110. Responsive to receiving the release messages, the call control element 110 terminates the call and transfers AMA data with the operator services switch to ascertain billing for the present call based on the predefined billing arrangements. The call control element 110 or alternatively, the operator services switch thereafter bills the call based on the predefined billing arrangements.

Figure 7:
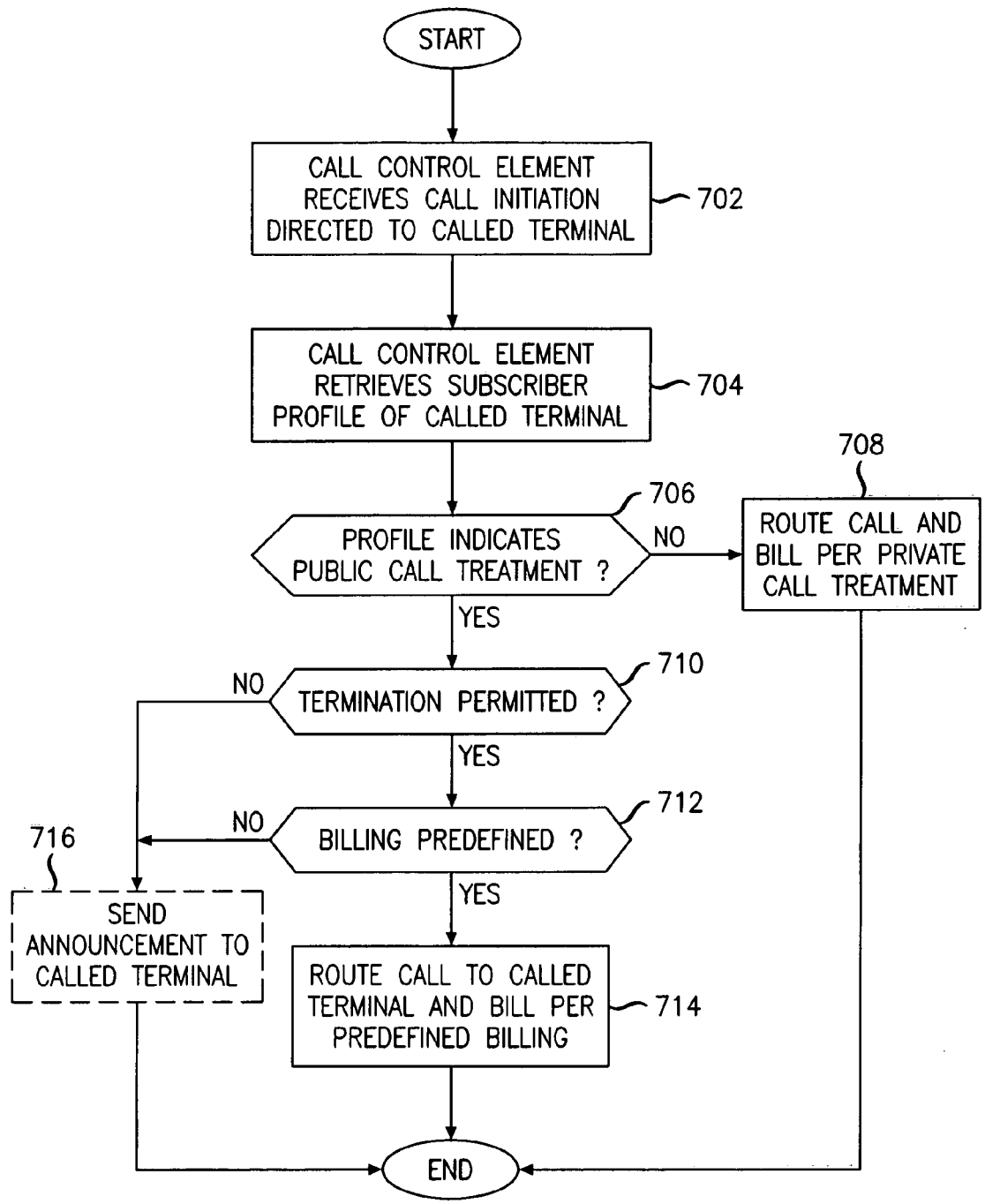
FIG. 7 is a flowchart of a method for processing a call termination directed to a private party device subject to public call treatment according to an embodiment of the invention.

Turning now to FIG. 7, there is shown a flowchart of a method that may be implemented in the communication system of the type shown in FIG. 1 for processing a call termination directed to a private party device subject to public call treatment according to an embodiment of the invention. With reference to FIG. 1, the steps of FIG. 7 are implemented in the context of a call originated by calling terminal 102 and directed to called terminal 104.

At step 702 the call control element 110 receives a call initiation from calling terminal 102 that is directed to called terminal 104. Coincident to receiving the call initiation, the call control element receives directory number information associated with the calling terminal and called terminal along with relevant control, signaling and authentication information.

At step 704, the call control element 110 retrieves the subscriber profile of the called terminal 104 from database 112; and at step 706, the call control element determines whether or not the subscriber profile indicates that called terminal 104 is flagged for public call treatment.

If the profile does not indicate public call treatment, the method proceeds to execute private call treatment at step 708.

Typically, under private call treatment, the call control element 110 analyzes the received digits to determine routing for the call; and then routes the call through interconnecting network 108 toward the called terminal 104 without connection to or assistance from operator service switch 116. In one embodiment, the call control element further arranges billing for the call according to the billing model associated with the called terminal 104. If a prepaid billing model is used, the call control element is operable to end the call if the prepaid balance is consumed; and optionally, may provide an announcement to the called terminal prior to expiration of the balance.

In one embodiment, if the profile indicates public call treatment, call terminations will be completed to the called terminal only if terminations are indicated to be authorized in the subscriber profile, determined at step 710 and if billing is predefined, determined at step 712. In particular, as noted in relation to FIG. 2, public call treatment may be configured to exclude (i.e., "turn off") call terminations. If so configured, the call control element will reach a negative determination at step 710 and will end the call without routing the call to the called terminal. Further, a prospective called terminal may predefine billing arrangements with an operator services switch (similarly to that described in relation to FIG. 3 in the context of a calling terminal). In one embodiment, predefined billing may also be implemented independently by the call control element, for example, to allow free terminations to the called terminal 104. If billing is not predefined, the call control element will reach a negative determination at step 712 and will end the call without routing the call to the called terminal.

Optionally, at block 716, responsive to a negative determination at step 710 or step 712, the call control element may send an announcement, report or the like informing the called terminal that the prospective call termination was not completed. It is contemplated that such announcement or report may indicate the reason why the call was not completed (e.g., because terminations are not permitted or because billing is not predefined) and may be generated on a call by call basis or as a cumulative report associated with a plurality of call terminations that were not completed while the called terminal was in public mode.

If call terminations are permitted and billing is predefined, a positive determination is reached at steps 710 and 712 and at step 714, the call control element routes the call through interconnecting network 108 to the called terminal, thereby completing the call. To the extent the predefined billing arrangement is known to the call control element, the call control element executes billing for the call at step 714. Alternatively or additionally, the call control element may query the operator services switch for the billing information or may instruct the operator services switch to execute billing for the call.

The present invention may be embodied in other specific forms without departing from its spirit or essential characteristics. The described embodiments are to be considered in all respects only as illustrative and not restrictive. For example and without limitation, a method for processing a call origination or termination could be implemented without consulting a subscriber profile if public call treatment is established coincident to the instant call; or the methods could be implemented by consulting a subscriber profile for additional or different or criteria than described in relation to FIG. 3 or FIG. 7. The scope of the invention is, therefore, indicated by the appended claims rather than by the foregoing description. All changes that come within the meaning and range of equivalency of the claims are to be embraced within their scope.

What is claimed is:

1. A method for provisioning public call treatment for calls initiated from a private party telephony device comprising the steps of:
   receiving, from an owner of a private party telephony device, a request to activate public call treatment for the private party telephony device;
   responsive to the request, updating a subscriber profile associated with the private party telephony device to indicate public call treatment, the private party telephony device thereby provisioned for public call treatment for one or more subsequent calls initiated from the private party telephone device; and
   for so long as the private party telephony device is provisioned for public call treatment, providing public call treatment for calls initiated from the private party telephony device.

2. The method of claim 1, further comprising:
   for so long as the private party telephony device is provisioned for public call treatment, permitting call terminations directed to the private party telephony device.

3. The method of claim 1, further comprising:
   for so long as the private party telephony device is provisioned for public call treatment, excluding call terminations directed to the private party telephony device.

4. The method of claim 1, wherein the step of receiving a request comprises receiving a predesignated function code associated with the request for public call treatment and a password associated with the owner of the private party telephony device.

5. The method of claim 1, further comprising:
   receiving, from the private party telephony device provisioned for public call treatment, a request to deactivate public call treatment;
   responsive to the request, updating the subscriber profile associated with the private party telephony device to indicate private call treatment, the private party telephony device thereby provisioned for private call treatment; and
   for so long as the private party telephony device is provisioned for private call treatment, providing private call treatment for calls initiated from the private party telephony device.

6. The method of claim 5, wherein the step of receiving a request comprises receiving a predesignated function code associated with the request to deactivate public call treatment and a password associated with the owner of the private party telephony device.

7. A method, performed by a call control element, for processing a call initiation from a private party telephony device, the method comprising:
   receiving a call initiation from a private party telephone device;
   determining a call treatment status of the private party telephony device, the call treatment status being provisionable by the owner of the private party telephony device between a private call treatment status and public call treatment status;
   if the private party device is provisioned for public call treatment status, providing public call treatment for the call; otherwise
   if the private party device is provisioned for private call treatment status, providing private call treatment for the call.

8. The method of claim 7, wherein the step of determining a call treatment status is accomplished by consulting a subscriber profile associated with the private party telephony device.

9. The method of claim 7, wherein the step of providing private call treatment comprises:
   routing the call to a called terminal; and
   billing the call according to a predefined billing arrangement with a user of the private party telephony device without assistance of an operator service platform.

10. The method of claim 7, wherein the step of providing public call treatment comprises:
   with assistance of an operator services platform, establishing a billing arrangement with a user of the private party telephony device;
   routing the call to a called terminal; and
   billing the call according to the billing arrangement with the user of the private party telephony device.

11. The method of claim 10, wherein the billing arrangement with the user of the private party telephony device comprises one of collect, credit card, calling card or third number billing for the call arranged with assistance of the operator service platform.

12. A method, performed by a call control element, for processing a call termination directed to a private party telephony device, the method comprising:
   receiving a call request directed to a private party telephone device;
   determining a call treatment status of the private party telephony device, the call treatment status being provisionable by the owner of the private party telephony device between a private call treatment status and public call treatment status;
   if the private party device is provisioned for public call treatment status, providing public call treatment for the call; otherwise
   if the private party device is provisioned for private call treatment status, providing private call treatment for the call.

13. The method of claim 12, wherein the step of determining a call treatment status is accomplished by consulting a subscriber profile associated with the private party telephony device.

14. The method of claim 12, wherein the step of providing private call treatment comprises:
   routing the call to the private party telephony device; and
   billing the call according to a predefined billing arrangement with a user of the private party telephony device without assistance of an operator service platform.

15. The method of claim 12, wherein the step of providing public call treatment comprises determining whether call terminations are permitted to the private party telephony device; and
   if call terminations are permitted, routing the call to the private party telephony device and billing the call according to a predefined billing arrangement with a user of the private party telephony device.

16. The method of claim 15, wherein the step of determining is accomplished by consulting a subscriber profile associated with the private party telephony device.

17. The method of claim 12, wherein the step of providing public call treatment comprises determining whether a billing arrangement has been predefined for call terminations directed to the private party telephony device; and
   if billing arrangements have been predefined, routing the call to the private party telephony device and billing the call according to the predefined billing arrangements.

18. The method of claim 17, wherein the step of determining is accomplished by consulting a subscriber profile associated with the private party telephony device.

19. The method of claim 12 wherein the step of providing public call treatment comprises determining whether call terminations are permitted to the private party telephony device and whether a billing arrangement has been predefined for call terminations directed to the private party telephony device; if call terminations are permitted and a billing arrangement is predefined, routing the call to the private party telephony device and billing the call according to the predefined billing arrangements.

20. The method of claim 19, wherein the step of determining is accomplished by consulting a subscriber profile associated with the private party telephony device.

* * * * *